(12) United States Patent
Cirkovic et al.

(10) Patent No.: US 9,036,466 B2
(45) Date of Patent: May 19, 2015

(54) METHODS AND APPARATUS FOR IMPROVING NETWORK COMMUNICATION USING ETHERNET SWITCHING PROTECTION

(71) Applicants: Sasha Cirkovic, San Francisco, CA (US); Pawan K. Singal, Sunnyvale, CA (US); Gowri Kuthanur, San Jose, CA (US)

(72) Inventors: Sasha Cirkovic, San Francisco, CA (US); Pawan K. Singal, Sunnyvale, CA (US); Gowri Kuthanur, San Jose, CA (US)

(73) Assignee: Tellahs Operations, Inc., Naperville, IL (US)

( * ) Notice: Subject to any disclaimer, the term of this patent is extended or adjusted under 35 U.S.C. 154(b) by 0 days.

(21) Appl. No.: 14/146,519

(22) Filed: Jan. 2, 2014

(65) Prior Publication Data

US 2014/0119176 A1    May 1, 2014

Related U.S. Application Data

(63) Continuation of application No. 13/180,864, filed on Jul. 12, 2011, now Pat. No. 8,675,479.

(51) Int. Cl.
*H04L 12/26* (2006.01)
*H04L 12/707* (2013.01)
*H04L 12/703* (2013.01)

(52) U.S. Cl.
CPC ............ *H04L 43/0811* (2013.01); *H04L 43/10* (2013.01); *H04L 45/22* (2013.01); *H04L 45/28* (2013.01)

(58) Field of Classification Search
None
See application file for complete search history.

(56) References Cited

U.S. PATENT DOCUMENTS

| 7,345,991 B1 * | 3/2008 | Shabtay et al. | 370/221 |
| 2009/0161562 A1 * | 6/2009 | Shah et al. | 370/245 |
| 2012/0002539 A1 * | 1/2012 | Khan et al. | 370/227 |
| 2012/0020206 A1 * | 1/2012 | Busi et al. | 370/217 |
| 2012/0157091 A1 * | 6/2012 | Parker | 455/424 |

* cited by examiner

*Primary Examiner* — Kerri Rose
(74) *Attorney, Agent, or Firm* — James M. Wu; JW Law Group

(57) ABSTRACT

A network layout between network elements and routers using network redundancy to improve reliability of network communication is disclosed. Upon detecting a link failure associated with a primary link between an access switch and a primary router by the access switch via a connectivity verification protocol, the access switch sends a message to the primary router indicating connection defect via the connectivity verification protocol such as IEEE 802.1ag standard. After enabling protection switching mechanism to activate a secondary link between the access switch and a backup router for network communication, routing data streams are routed between the access switch and the router via the secondary link. In one aspect, the protection switching mechanism is operated in accordance with G.8031 under International Telecommunication Union ("ITU") standard.

20 Claims, 10 Drawing Sheets

METHODS AND APPARATUS FOR IMPROVING NETWORK COMMUNICATION USING ETHERNET SWITCHING PROTECTION

PRIORITY

This patent application is a continuation of U.S. patent application of U.S. patent application Ser. No. 13/180,864, filed on Jul. 12, 2011 in the name of the same inventor and entitled "Method and Apparatus for Improving Network Communication Using Ethernet Switching Protection," hereby incorporated into the present application by reference.

FIELD

The exemplary embodiment(s) of the present invention relates to communications network. More specifically, the exemplary embodiment(s) of the present invention relates to improve network performance and reliability by employing a dual homing network configuration.

BACKGROUND

A high-speed network environment typically includes network devices such as access switches, routers, and bridges used to facilitate delivery of information packets and/or data traffic from source devices to destination devices. Information pertaining to the transfer of packet(s) through the network is usually embedded within the packet itself. Each packet traveling through one or more communications networks such as Internet and/or Ethernet can typically be handled independently from other packets in a packet stream or traffic. For example, each router which may include routing, switching, and/or bridging engines processes incoming packets and determines where the packet(s) should be forwarded.

In a high-speed computing network environment, it is critical to maintain high speed traffic flows with minimal data loss and/or packet drop. As such, it is important to detect failures relating to data links and/or connections between the network devices, thereby allowing for traffic flows to be maintained and rerouted so as reducing packet drop(s). A problem associated with a high-speed computing network is data (or packet) loss due to data connection(s) (or data link) failure. One cause of data loss is to continue sending the data packets to a router over a data link after the data link is already closed (or down).

A conventional approach is to use Rapid Spanning Tree Protocol ("RSTP") or Spanning Tree Protocol ("STP") to reduce looping and black-holing of data traffic. However, a drawback associated with RSTP is slow response time. For example, RSTP could typically take a few seconds to respond a scenario of remote link failure. Packets or data streams may be lost if a network device is unable to respond to a link failure in a reasonable span of specified time.

SUMMARY

A network layout between network elements and routers using network redundancy to improve reliability of network communication is disclosed. Upon detecting a link failure associated with a primary link between an access switch and a primary router by the access switch via a connectivity verification protocol, the access switch sends a message to the primary router indicating connection defect via the connectivity verification protocol such as IEEE 802.1ag standard. After enabling protection switching mechanism to activate a secondary link between the access switch and a backup router for network communication, routing data streams are routed between the access switch and the router via the secondary link. In one aspect, the protection switching mechanism is operated in accordance with G.8031 under International Telecommunication Union ("ITU") standard.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
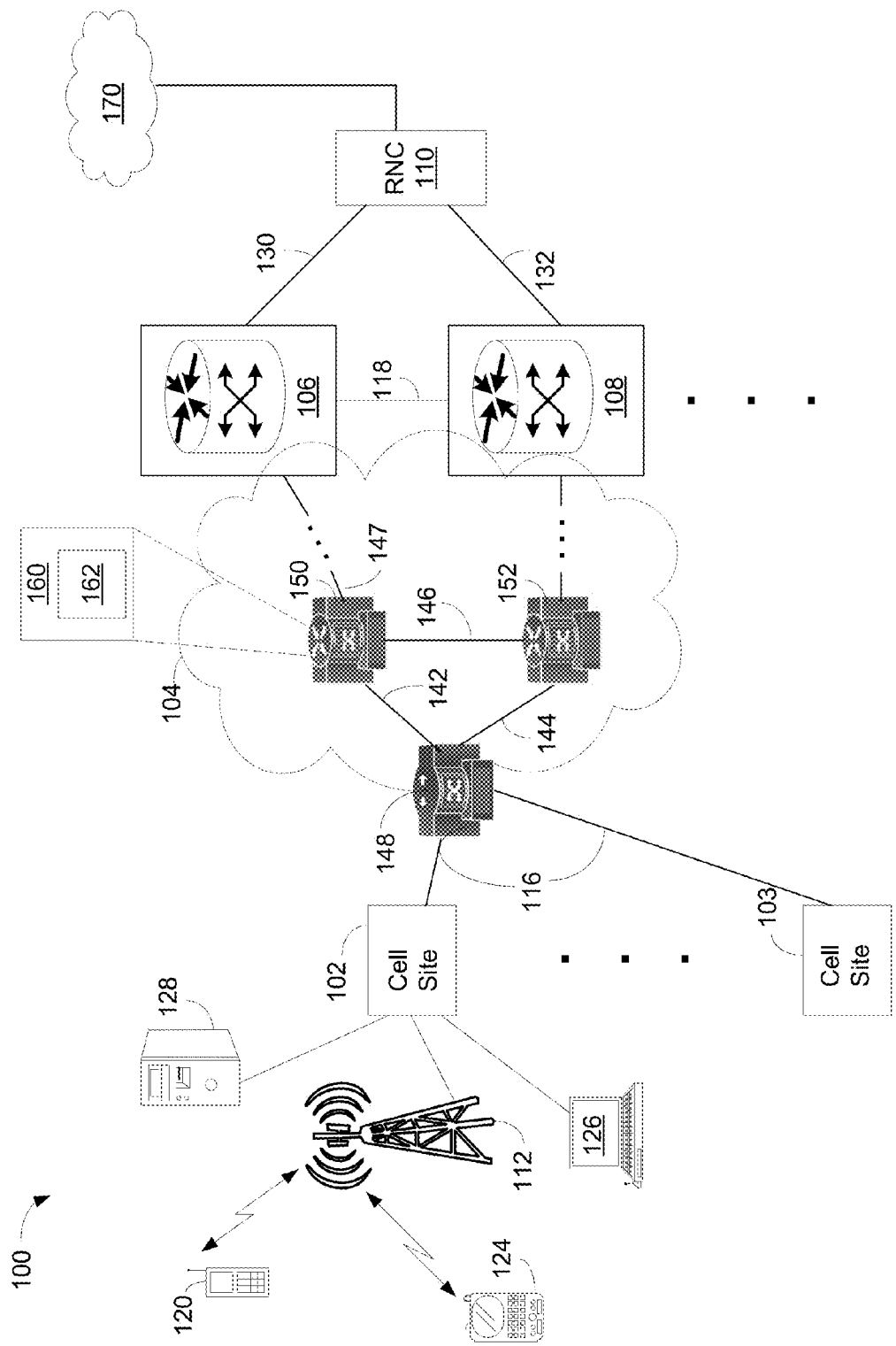
FIG. 1 is a block diagram illustrating a computer network having a primary router and backup router organized in a dual homing configuration in accordance with one embodiment of the present invention.

Exemplary embodiment(s) of the present invention is described herein in the context of a method, device, and apparatus of improving network performance and reliability using a dual homing protection network redundancy and connectivity checking and verification system.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, for example, IP type, and those packets (here IP packets) comprise an IP header, a header specific to the transport medium (for example UDP or TCP) and payload data. The IP network may also include a satellite network, for example a DVB-RCS (Digital Video Broadcasting-Return Channel System) network, providing Internet access via satellite, or an SDMB (Satellite Digital Multimedia Broadcast) network, or a terrestrial network, for example a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Embodiments of the present invention illustrate a network layout between network elements and routers using network redundancy to improve reliability of network communication. When a host or access switch detects a link failure associated with a primary link between an access switch and a primary router via a connectivity verification message such as IEEE 802.1ag, the access switch sends a message to the primary router indicating a connection defect or failure. After enabling a protection switching mechanism to activate a secondary or backup link, the access switch begins to route data via a backup router via the backup link using a dual homing network redundancy as protection switching mechanism. In one aspect, the protection switching mechanism is operated in accordance with G.8031 under International Telecommunication Union ("ITU") standard ("G.8031").

FIG. 1 is a block diagram 100 illustrating a computer network having a primary router and backup router organized in a dual homing configuration in accordance with one embodiment of the present invention. Diagram 100 includes multiple cell sites 102-103, a switching network 104, multiple routers, and a Radio Network Controller ("RNC") 110. RNC 110 is further coupled with a Wide Area Network ("WAN") and/or Internet 170. Depending on the applications, RNC 110 may be coupled with other RNC or RNCs to enhance network management and capacities. In an alternative configuration, RNC 110 may be replaced with other network element(s) such as gateway(s) and router(s). It should be noted that the underlying concept of the exemplary embodiment(s) of the present invention would not change if one or more blocks (or elements) were added to or removed from diagram 100.

Switching network 104 includes an access switch ("AS") 148, a primary router 150, and a backup router 152 wherein AS 148 and routers 150-152 are configured to form a dual homed or dual homing redundancy network configuration. AS 148, in an alternative embodiment, is located at the edge or outside of switching network 104, and is coupled to one or more cell sites 102-103 via connections 116. Switching network 104 may include additional network elements ("NEs") and/or network management system ("NMS") depending on the applications. Routers 106-108, in one embodiment, can be edge routers and/or routers inside of switching network 104. Switching network 104, in one example, can be an IP and/or Multi Protocol Label Switching ("MPLS") based circuit network which may operate at a layer of Open Systems Interconnection Basic Reference Model ("OSI model"). Network 104 may further include a circuit switch block and a backhaul block for transferring information and/or various data traffic to and from network clients.

Switching network 104, in one embodiment, includes a virtual network such as Virtual Private LAN Service ("VPLS") and virtual local area network ("VLAN"). VPLS provides Ethernet based multipoint to multipoint communication over the IP/MPLS network. VPLS is also able to use pseudo-wires ("PW") to connect multiple geographically separated hosts and/or nodes and allows the dispersed nodes to share the same or similar Ethernet broadcast domain. VLAN, on the other hand, is a logical LAN or multiple LANs grouping multiple hosts allowing hosts to communicate using the same broadcast domain. A VLAN uses the similar requirements and/or attributes as a physical LAN and links multiple hosts or devices together even if they are not located on the same network switch. It should be noted that various protocols, such as interior border gateway protocol ("iBGP"), MPLS, OSPF, and RSVP (resource reservation protocol), may be used as Layer 2 (L2) VPN (virtual private network) related applications.

AS 148, in one embodiment, is a managed edge system and/or management system capable of managing a network, connections, ports, or switching services. For example, AS 148 allows service providers' access networks at traffic aggregation points or cell sites. An advantage of employing AS 148 is that it provides a scalable network solution between customer equipment ("CE") and provider edge ("PE") routers for data transfer. AS 148, in one example, is capable of performing both access switching functions and router functions.

A router, for example, is an NE or network device capable of forwarding data packets across one or more communication networks in accordance with its routing mechanism such as a routing table. A router may be a microprocessor-controlled computing system which may be coupled to two or more data lines configured to direct data traffic through one or more communication networks. NE or network client, in one example, can include one or more routers, hubs, switches, hosts, base stations, and the like. A NMS, in one aspect, is a computer system or server including hardware and/or software used to monitor and control the network including various NEs. Diagram 100, for example, includes routers 106-108 which are capable of routing information between cell sites 102-103 and RNC 110 via switching network 104.

A dual homed redundancy host, network or gateway is, for example, situated between two interfaces to enhance data integrity or prevent data drop. Dual homed redundancy, also known as dual homing, provides two independent data paths for each dual attached device. AS 148, in one embodiment, is structured in a dual homed redundancy configuration wherein a primary path 142 is used to connect AS 148 to primary router 150 and a secondary path 144 is used to connect AS 148 to a backup router 152. Under normal conditions, AS 148 transmits data packets to and from primary router 150 via primary path 142. In the event that path 142 or primary router fails, AS 148 switches its connection from primary router 150 to backup router 152 whereby AS 148 can continue network services via a backup route. When primary router 150 recovers from an earlier crash or failure, it, in one embodiment, instructs AS 148 to switch back (or revert) from backup router 152 to primary router 150 in accordance with switching circuit 160 and content in IP routing table 162.

Primary and backup routers 150-152, for example, are also interconnected by Interior Gateway Protocol ("IGP") 146 for redundancy purposes. Similarly, routers 106-108 are also interconnected by IGP 118. Each router, for example, includes functions of IP routing. Connections 130-132 are used to couple RNC 110 with routers 106-108 wherein connections 130-132 can be land line connections, wireless connections, or a combination of wired and wireless connections.

Cell site 102, also known as a base station, includes a radio tower 112, a computer 126, and a server 128, wherein radio tower 112 further includes a cellular phone 120 and a handheld device 124 connected via wireless communications. Base station or cell site 102 is capable of communicating with mobile devices such as cellular phone 120 and handheld device 124 via radio tower 112. It should be noted that cell site 102 may include additional radio towers as well as other land switching circuitry, not shown in FIG. 1. The cell stations such as cell sites 102-103 can be configured to support wireless communications as well as wired communications. Each cell site such as cell site 102 can be considered as a host and is capable of maintaining a connectivity session such as a bidirectional forwarding detection ("BFD") session with a destination router so as to continuously verify the connectivity between the host and the router.

BFD is a network connectivity protocol used to authenticate or detect failures between two endpoints (i.e., a host and a master router). BFD is a short-duration for failure detection for path(s) between forwarding network elements including interfaces, data links, forwarding planes, and forwarding engines. A session is down if a BFD packet(s) is not received. It should be noted that, instead of using BFD sessions, other connectivity protocols can also be used. For example, Open Shortest Path First ("OSPF"), Intermediate System to Intermediate System ("IS-IS"), and/or any other protocols complying IEEE 802.1ag can be used. In an alternative embodiment, BFD is also known as continuity check ("CC") message(s).

Upon detecting a loss of CC message in accordance with IEEE 802.1ag, AS 148, in one embodiment, commences an operation of failover. Upon setting remote defect indication ("RDI") to one (1), hereinafter referred to as RDI=1, AS 148 sends a CC message with RDI=1 to primary router 150. After receiving RDI=1, primary router 150 issues a media access control ("MAC") withdrawal message which includes MAC addresses that have been learned overtime relating to ports belonging to a VPLS domain associated with AS 148. AS 148 switches (or fails) over to protected path or backup link in accordance with G.8031 and instructs backup router 152 to open its port via G.8031. Upon receipt of G.8031 message of open port, backup router 152 opens its port by setting transmitting port to one (1) (Tx=1). Backup router 152 sends an acknowledgement message in accordance with G.8031 to AS 148 once its port is opened.

For operation relating to reversion, after activating backup router 152 for routing services, primary router 150 begins a recovery process to restore (or resume) itself from inactive status to active status. Once primary router 150 is restored and is able to resume network service, primary router 150 reestablishes label-switched path ("LSP") using RSVP via connection 142 between router 150 and AS 148. When AS 148 detects 802.1ag CC from router 150, AS 148 sends a 802.1ag CC message with reset of RDI (RDI=0) to primary router 150. Primary router 150 clears RDI condition(s) after it receives RDI=0 from AS 148. Upon commencement of a revert-timer, AS 148 notifies the backup router that the revert-timer is ticking (or counting) and that the backup link will continue to be used until the revert-timer expires. When the revert-timer expires, AS 148 switches back to G.8031 working path or primary link 142 and instructs backup router 152 to close its port (Tx=0) in accordance with G.8031 message. Backup router 152 subsequently closes its port (Tx=0) and sends an acknowledgement message to AS 148. Backup router 152 broadcasts MAC withdrawal message which includes MAC addresses that have been learned to all ports that belong to the same VPLS domain associated with AS 148.

It should be noted that the predefined condition(s) can be set by users, providers, or network administrator(s). For example, the predefined condition may be set to a minimal number of routing paths which is sufficient for a router to process and route an incoming packet. The predefined condition can also identify which condition to use. For example, the predefined condition may indicate use IP routing table or use IP routing table plus BGP session(s).

An advantage of providing a redundant dual homing networking solution employing G.8031 and CC messages is to improve reliability of network services. A dual homing protection of G.8031 network using VPLS allows a failover or failure recovery process in case of nodal failures.

Figure 2A:
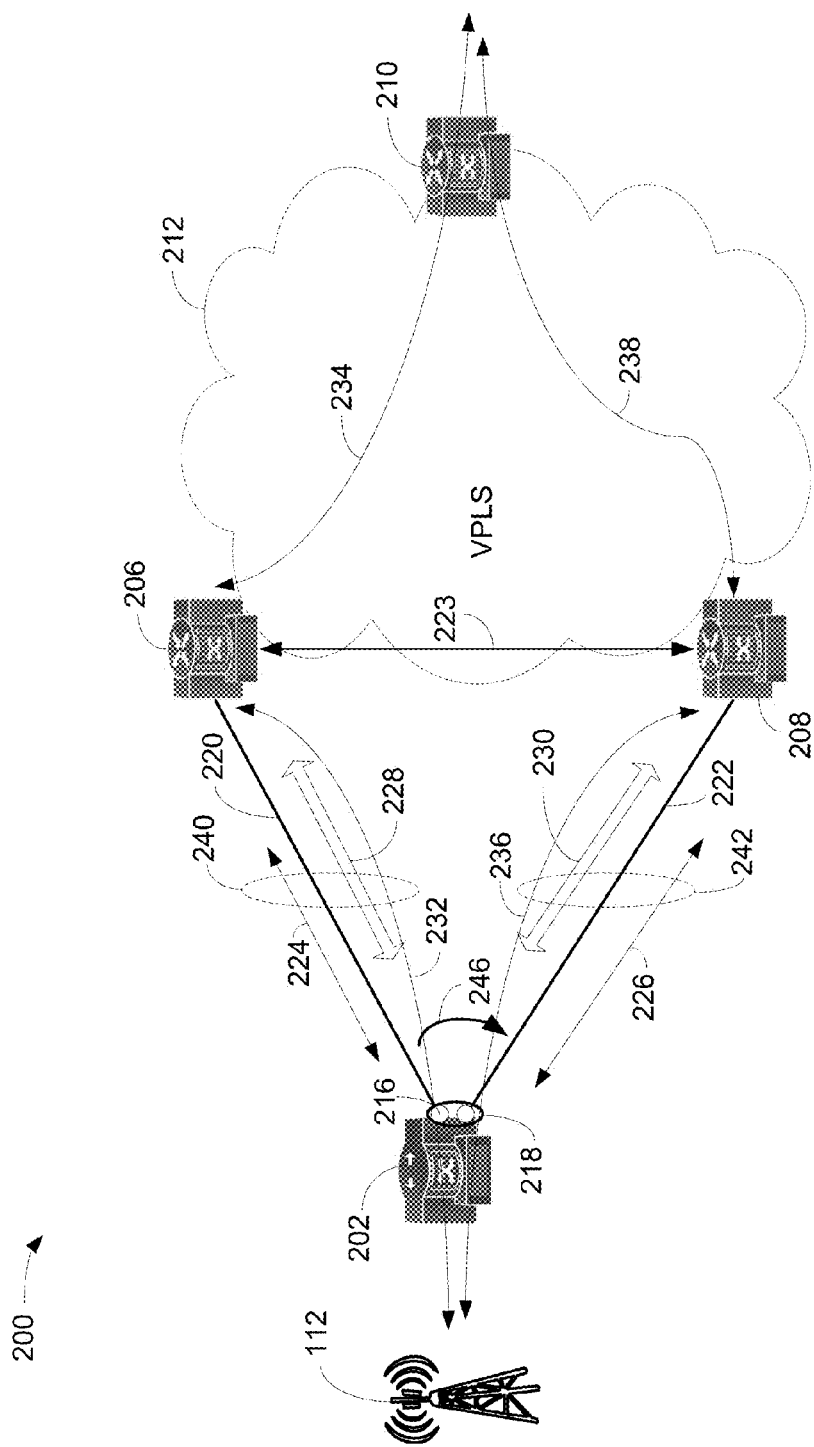
FIGS. 2A-B are block diagrams illustrating an exemplary computer network layout organized in a dual homing redundancy configuration capable of failing over to backup router(s) in accordance with one embodiment of the present invention.

FIG. 2A is a block diagram 200 illustrating an exemplary network layout organized in a dual homing redundancy configuration capable of failing over to a backup router(s) in accordance with one embodiment of the present invention. Diagram 200 includes a NE 202, routers 206-210, and links 220-223 wherein links 220-223 are used to connect NE 202 and routers 206-208. NE 202 is further configured to communicate with other network device, such as a cell site, base station, or radio tower 112. NE 202, for example, may be a node, AS, router, hub, or a combination of routers, hubs, AS, and/or switches. NE 202 is, in one embodiment, an AS, hereinafter referred to as AS 202. It should be noted that the underlying concept of the exemplary embodiment(s) of the present invention would not change if one or more blocks (or devices) were added to or removed from diagram 200.

To enhance data integrity as well as network reliability, network layout shown in diagram 200 illustrates a dual homed redundancy network, also known as dual VLAN topology. In one embodiment, the dual homed or dual homing network configuration includes an AS 202, primary router 206, and backup router 208 wherein AS 202 is coupled to a first end of a primary link 220 and primary router 206 is coupled to a second end of primary link 220. AS 202, for example, verifies connectivity between AS 202 and primary router 206 via a connectivity verification protocol over primary link 220. The connectivity verification protocol, for example, may use CC messages under IEEE 802.1ag standard, which hereinafter can also be referred to as 802.1ag CC message. Primary router 206, on the other hand, is configured to communicate with AS 202 via a linear protection switching protocol.

The linear protection switching protocol, in one example, is G.8031 providing working and protected paths managed according to ITU standard, hereinafter can be referred to as G.8031 message. Backup router 208 is coupled to AS 202 via a backup link 222 and is operable to provide a dual homed network redundancy between AS 202 and primary router 206 via the linear protection switching protocol. In one example, primary link 220 can be a VLAN and backup link 222 can be a backup VLAN.

AS 202 and routers 206-208 are structured in a dual homed redundancy network configuration wherein primary path 220 is used to connect AS 202 to primary router 206 and secondary path 222 is used to connect AS 202 to a backup router 208. Under normal conditions, AS 202 transmits data packets to and from primary router 206 via primary path 220. In the event that path 220 or primary router 206 fails, AS 202 switches its (logic) connection from primary router 206 to backup router 208 whereby AS 202 is able to continue providing network services/routing via a backup route. When primary router 206 recovers or restores from an earlier crash or failure, primary router 206, in one embodiment, informs AS 202 that it is ready to receive and route data again. To switch back (or revert) from backup router 208 to primary router 206, AS 202 begins a reversion process including activating a revert-timer and closing the backup router's port(s).

AS 202, in one embodiment, includes a G.8031 bundle 218, wherein bundle 218 further includes multiple G.8031 ports connected to multiple links for providing link protection or redundancy. AS 202 employs 802.1ag messages 224-226 to check connectivity over links 220-222 respectively, and uses G.8031 messages 228-230 to switch between primary router 206 and backup router 208. Links 220-222 are configured to facilitate transferring information including 802.1ag message and G.8031 message. Alternatively, links 220-222 may include multiple sub-links wherein some sub-links are dedicated to handle 802.1ag CC message while other sub-links are dedicated to handle G.8031 messages.

During normal conditions, data streams or data packets travel from radio tower 112 to router 210 via data paths 232-234 passing through AS 202 and primary router 206. While primary link 220 can be a primary VLAN, backup link 222 is a backup VLAN.

In one embodiment, router 208 can be provisioned as a primary router and router 206 may be provisioned as a backup router. Alternatively, a backup router may be dedicated to backup more than one primary router. Upon detecting a failure, a failover as indicated by arrow 246 will occur to switch from a working path 240 to a protected path 242. Primary and backup routers 206-208, for example, are also interconnected by IGP 223 to facilitate redundancy.

Alternatively, diagram 200 shows two redundant VLANs 240-242 from AS 202 to two separate nodes 206-208. AS 202 has a G.8031 protection group called Resilient VLAN Tunnel for the VLANs for connecting to routers 206-208. Note that the VLAN topology illustrated in diagram 200 allows service provider to set up a redundancy network at the physical as well as NE level.

An advantage of employing an embodiment(s) of the dual homed network using G.8031 Ethernet Virtual Connection Protection together with 802.1ag Ethernet OAM and VPLS MAC withdrawal is that it fails over between primary and backup routers with sufficient speed that does not affect normal network services and/or routing whereby packet loss or black-holing scenario is minimized or reduced.

Figure 2B:
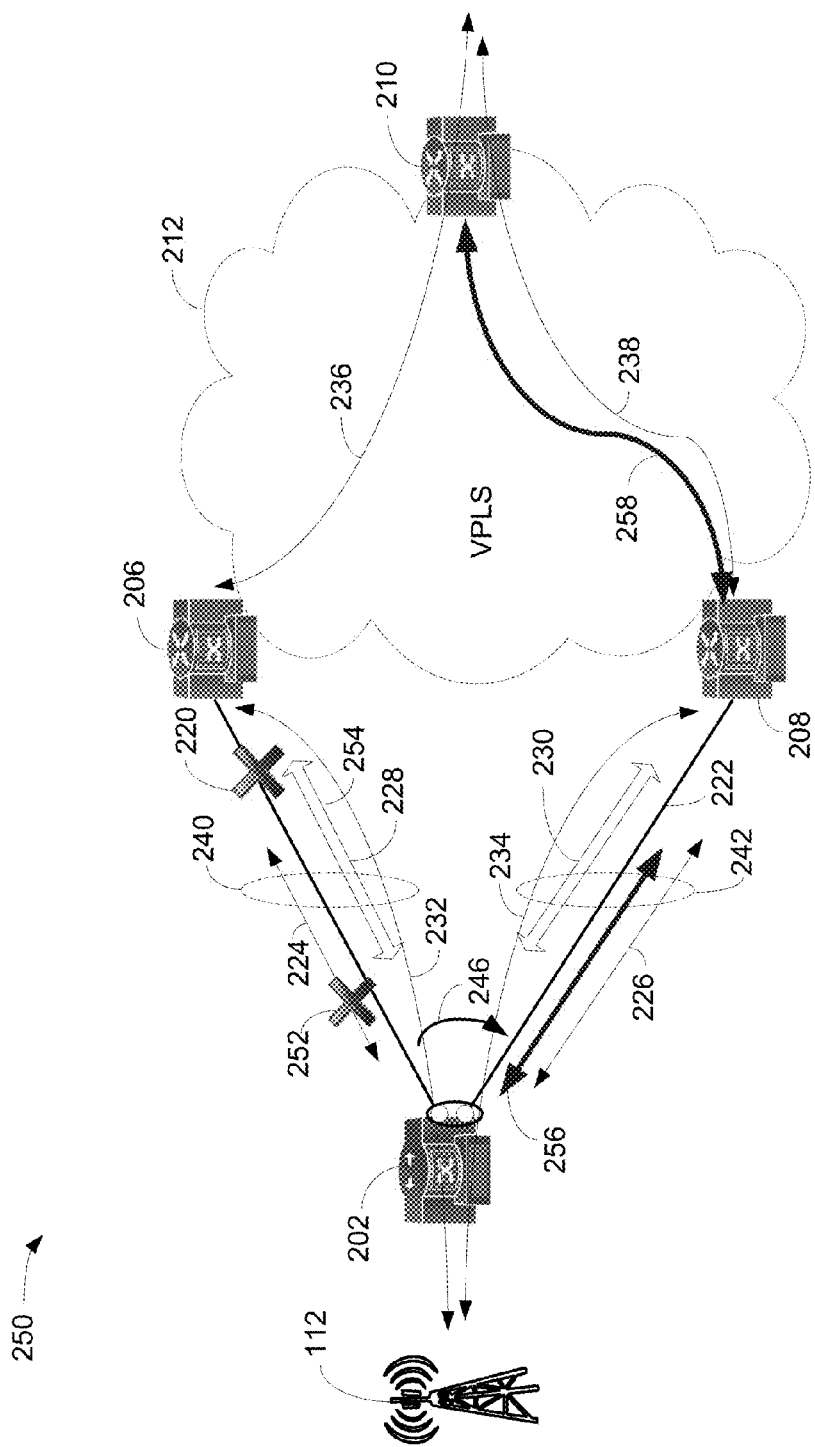

FIG. 2B is a block diagram 250 illustrating an exemplary computer network layout organized in a dual homed redundancy configuration capable of failing over to a backup router(s) in accordance with one embodiment of the present invention. Diagram 250, which is similar to diagram 200, includes an AS 202, routers 206-210, and links 220-222 wherein links 220-222 are used to connect AS 202 and routers 206-208 in such a way that a dual homed network configuration is formed. Note that AS 202 and routers 206-208 can also be referred to as node 202-208. It should be noted that the underlying concept of the exemplary embodiment(s) of the present invention would not change if one or more blocks (or devices) were added to or removed from diagram 250.

AS 202 includes input/output ("I/O") ports which are used to transmit and receive information between nodes 202-208 via connections or links 220-222. Links 220-222, for example, may be an Ethernet cable, USB (Universal Serial Bus) cable, phone lines, twisted pair cables, optical cables, and/or a combination of the above-mentioned connections. In one embodiment, links or connections 220-222 are configured to support one or more of network services such as point-to-point, point-to-multipoint (bridging), multipoint-to-multipoint (IP) services, and so on. Some exemplary applications, such as VLAN, IPTV, VoD, video conferencing, real time data, stock transactions, can employ the dual homed network topology to enhance communication performance.

Nodes 202-208, in one embodiment, are configured to employ connectivity fault management ("CFM") in accordance with IEEE 802.1ag. IEEE 802.1ag Ethernet CFM Protocol includes continuity check, CC messages, link trace and loopback protocols for assisting network operators to maintain/manage the network. IEEE 802.1ag defines a construct called MEP, which is capable of sending periodic CC messages PDUs (protocol data units) and is capable of receiving CC message PDUs. The MEP at each node, which is also referred to as Down MEP, sends a CC message over a port of a node through a link to periodically verify the connectivity between the two nodes. Since Down MEP is able to send a message in a direction to a port, it is well suited to employ as a protocol entity to detect node connectivity at the link level. It should be noted that both Up MEP & down MEP are capable of receiving the CC messages alike. Upon enabling of Down MEPs at nodes 202-208, CC messages are periodically sent, monitored, and received for connectivity verification.

During an operation, when AS 202 detects a loss of CC message 252 over link 220, AS 202 sets RDI to one (1) (RDI=1) and sends a CC message with RDI=1 to primary router 206 indicating that link 220 is down. After receipt of the CC message with RDI status (RDI=1), primary router 206 obtains MAC addresses learned overtime relating to the interface with AS 202, and sends a MAC withdrawal message containing learned MAC addresses to ports belonging to the same VPLS domain 212. AS 202 subsequently fails over to G.8031 protected path or link 222 and sends a G.8031 message 230 to backup router 208 instructing router 208 to open and set up its port for receiving data. After opening its port or setting its port to one (1) (Tx=1) indicating that it is ready to communicate with AS 202, backup router 208 sends a G.8031 message 230 to AS 202 notifying the port status. Upon receipt of port status from backup router 208, AS 202 begins to transmit to or receive data packets from router 210 via data paths 256-258.

An advantage of using a dual homed network configuration using G.8031 Virtual Connection protection and 802.1ag DOWN MEP over VPLS and MAC withdrawal mechanism is to seamlessly switchover to a backup router without losing a large amount of packets.

Figure 3A:
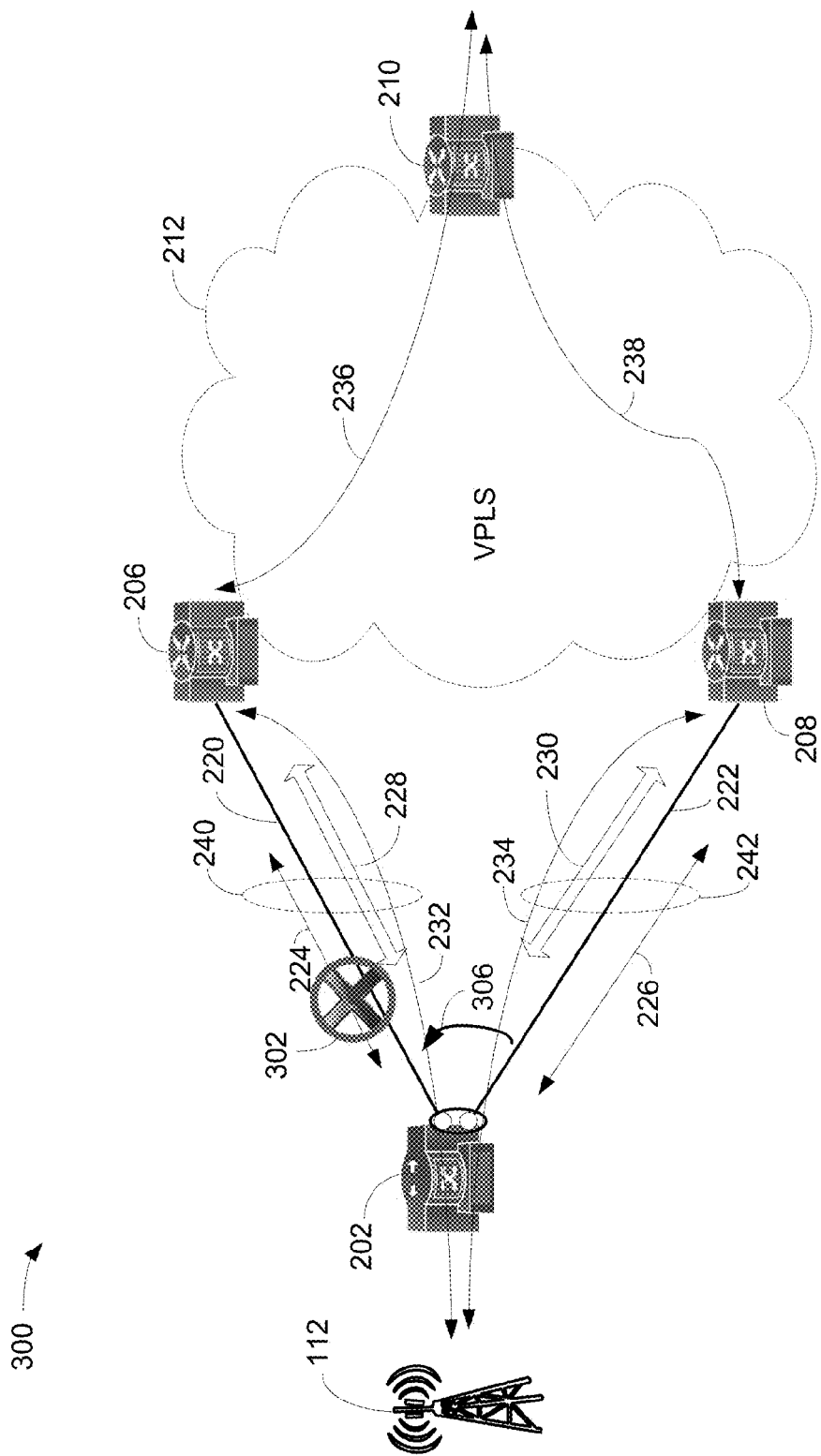
FIGS. 3A-B are block diagrams illustrating an exemplary computer network layout organized in a dual homing redundancy configuration capable of reverting back to primary or master router in accordance with one embodiment of the present invention.
Figure 3B:
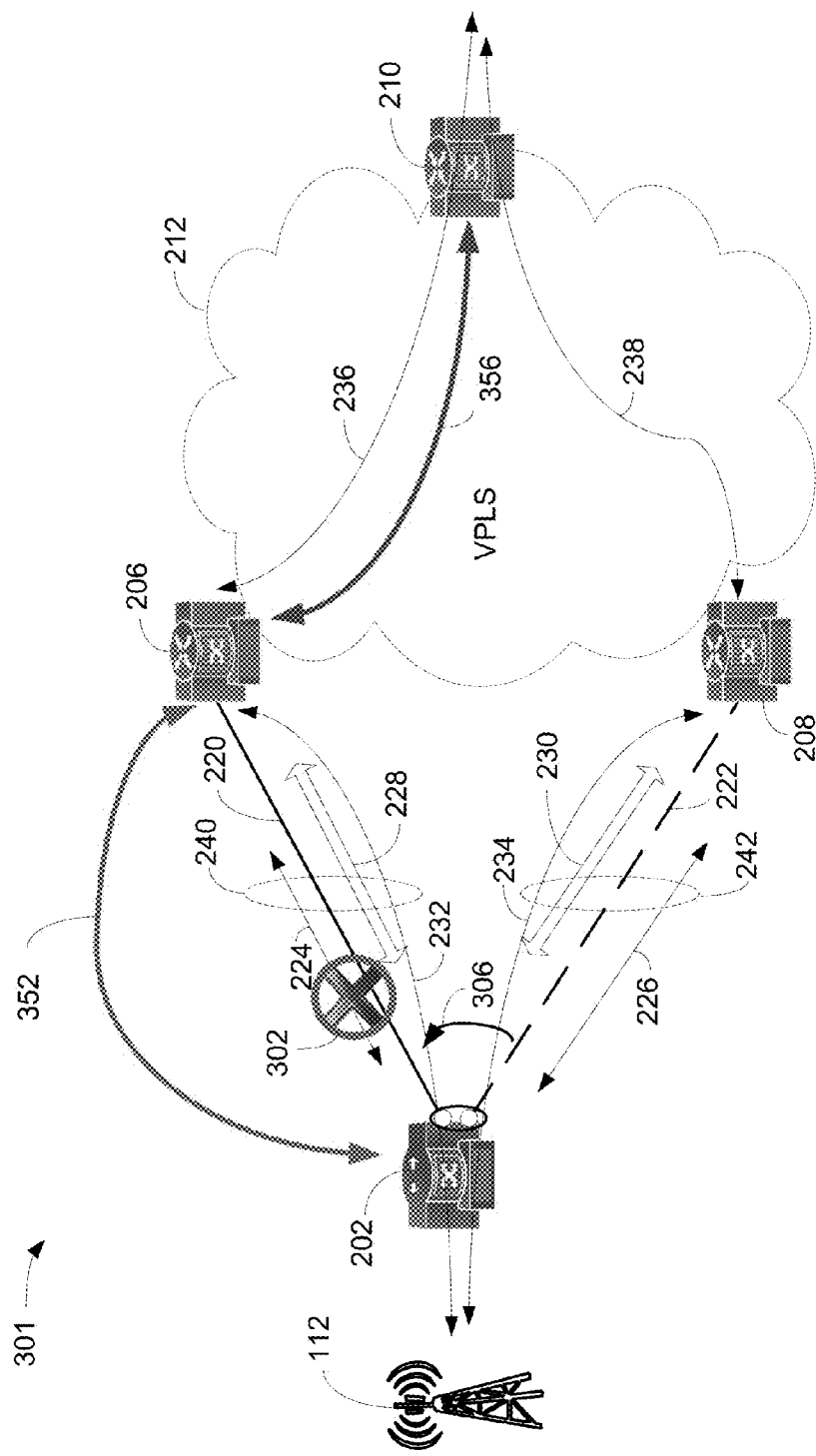

FIGS. 3A-B are block diagrams 300-301 illustrating an exemplary computer network layout organized in a dual homed redundancy configuration capable of reverting back to the primary or master router in accordance with one embodiment of the present invention. Diagram 300, which is similar to diagram 200, includes an AS 202, routers 206-210, and links 220-222 wherein links 220-222 are used to connect AS 202 and routers 206-208 in such a way that a dual homed network configuration is formed. It should be noted that the underlying concept of the exemplary embodiment(s) of the present invention would not change if one or more blocks (or devices) were added to or removed from diagrams 300-301.

The dual homed network shown in diagram 300 or 301 is in a reversion condition wherein backup router 208 is responsible to route the traffic between AS 202 and router 210 via data paths 234 and 238 while primary router 206 is in a process of recovery from an earlier failure. Once primary router 206 is recovered or restored as indicated by numeral 302 and is able to resume network service, primary router 206 reestablishes communication over link 220 between router 206 and AS 202. When AS 202 detects 802.1ag CC message 224 from primary router 206, AS 202 sends a 802.1ag CC message 224 providing resetting value of RDI (RDI=0) to primary router 206. Primary router 206 clears RDI condition(s) after it receives RDI=0 from AS 202. While the revert-timer is started, AS 202 notifies backup router 208 that the revert-timer has been commenced and backup link 222 will continue to serve or transfer data between AS 202 and router 210 until the revert-timer expires.

When the revert-timer expires, AS 202 switches back to G.8031 working path or primary link 220 and sends a G.8031 message 230 instructing backup router 208 to close its port or reset its port to zero (Tx=0). Backup router 208 closes its port or sets its port to zero (Tx=0) and sends an acknowledgement message to AS 202. Upon receipt of the acknowledgement message, AS 202 begins to facilitate packet transfer or data transfer between AS 202 and router 210 via data paths 352-356. The backup router subsequently retrieves MAC addresses learned overtime in connection to AS 202 interface, and sends a MAC withdrawal message containing the MAC addresses to ports belonging to the same VPLS domain 212.

In one example, a VPLS MAC withdrawal mechanism may be triggered based on 802.1ag defects. 802.1ag defects can be detected and monitored by VPLS DOWN MEP implementations. In a VPLS network environment, embodiment(s) of dual homed network using G.8031 protected service and 802.1ag messages employs features listed in Table 1 for switching over between the primary and backup nodes.

TABLE 1

Figure 4A:
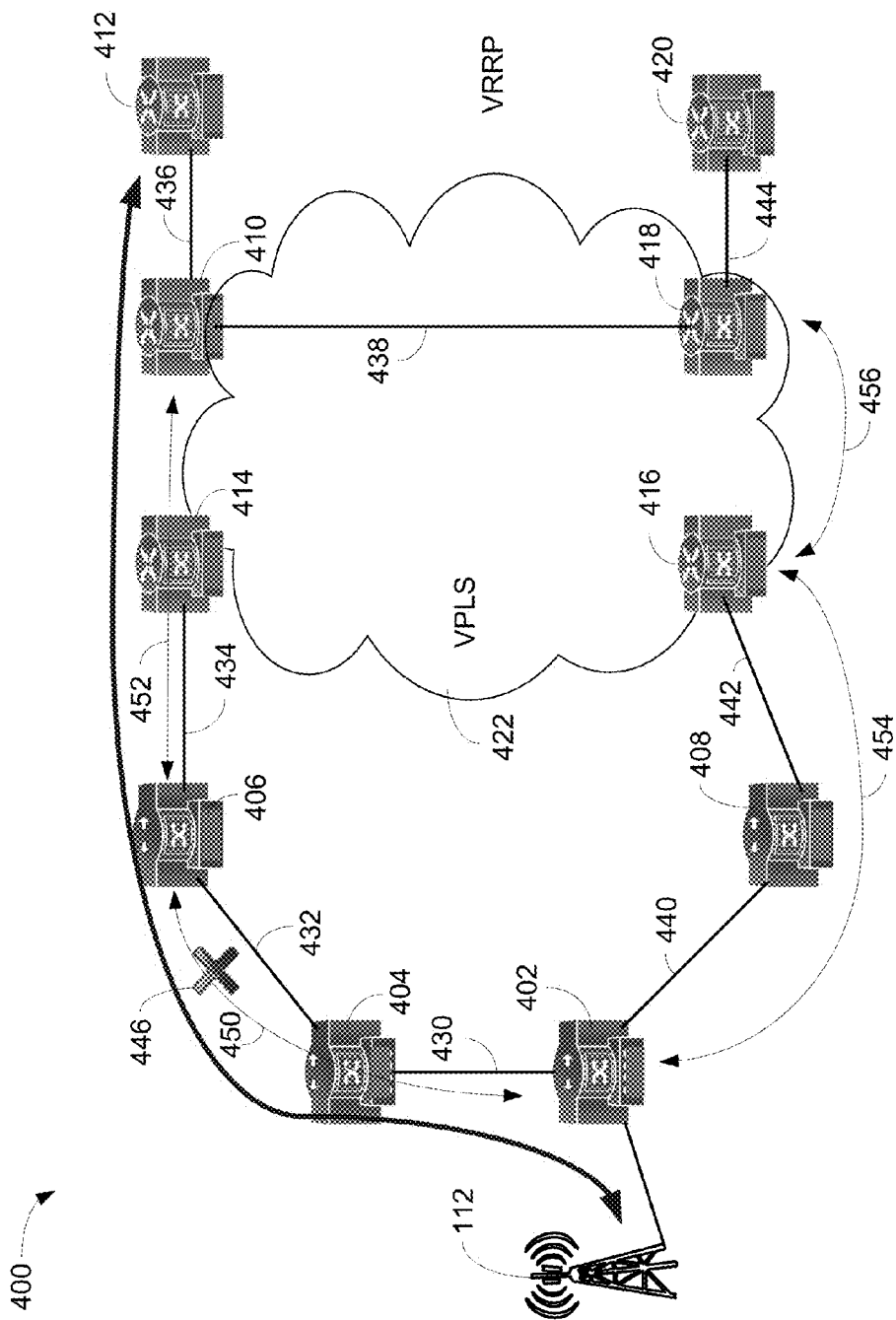
FIGS. 4A-B are block diagrams illustrating an exemplary computer network having multiple switches and router capable of failing over to backup router(s) upon detecting a link failure in accordance with one embodiment of the present invention.
Figure 4B:
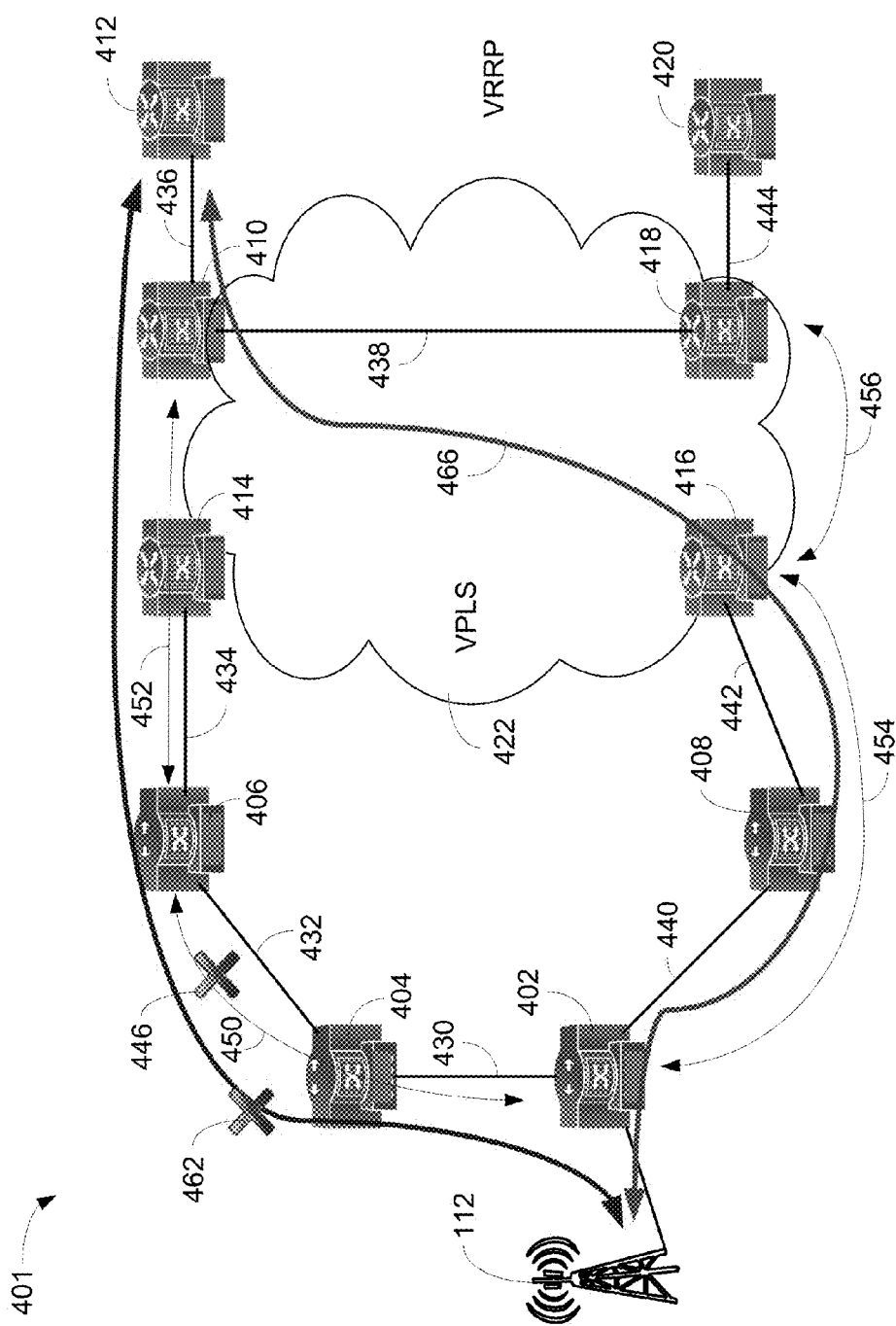

802.1 ag session time out triggers MAC LIST WITHDRAWAL MESSAGE
802.1 ag session time out triggers MAC FLUSH WITHDRAWAL MESSAGE
802.1 ag RDI triggers MAC LIST WIDTHRWAL MESSAGE
802.1 ag RDI triggers MAC FLUSH WIDTHRWAL MESSAGE
G.8031 Close port message trigger MAC LIST WITHDRAWAL MESSAGE
G.8031 Close port message trigger MAC FLUSH WITHDRAWAL MESSAGE
G.8031 Open Port Triggers MAC FLUSH MESSAGE
G.8031 Open Port Triggers MAC LIST WITHDRAWAL MESSAGE FIG. 4AB are block diagrams 400-401 illustrating an exemplary computer network having multiple switches and routers capable of failing over to backup router(s) upon detecting a link failure in accordance with one embodiment of the present invention. Diagrams 400-401 include ten (10) nodes 402-420 and links 430-444 wherein links 430-444 are used to connect nodes 402-420. In one embodiment, nodes 402-408 are access switches and nodes 412-420 are routers. AS 402 is able to communicate with one or more other network devices, such as a cell site, base station, or radio tower 112. It should be noted that the underlying concept of the exemplary embodiment(s) of the present invention would not change if one or more blocks (or devices) were added to or removed from diagrams 400-401.

The computer network shown in diagrams 400-401 illustrates a dual homed network layout wherein AS 402 connects to a primary router 414 through links 430-434 having data paths 450-452 and connects to a backup router 416 through links 440-442 having data paths 454-456. In an alternative embodiment, AS 404 is backed up by backup router 416 via links 430 and 440-442 through AS 402. It should be noted that a backup router such as router 418 may be used to backup more than one primary or master router. Routers 410 and 414-418, in one aspect, are coupled via VPLS 422, and router 412 and 420 may be VRRP routers.

During an operation, data packets travel from radio tower 112 to router 412 routed by primary router via data path 446. When AS 402 detects an 802.1ag failure 446 such as a loss of CC message, AS 402 sends a G.8031 message to primary router 414 indicating that primary VLAN which includes links 430-434 is down as indicated by numeral 462. Upon receipt of VLAN down or offline notification, AS 402 fails over to backup router 416 via protected paths or links 440-442 for continuing routing the traffic from radio tower 112 to router 410 via newly established data path 466 via links 440-442 and 438. A reversion process takes place when the 802.1ag failure 446 recovers.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
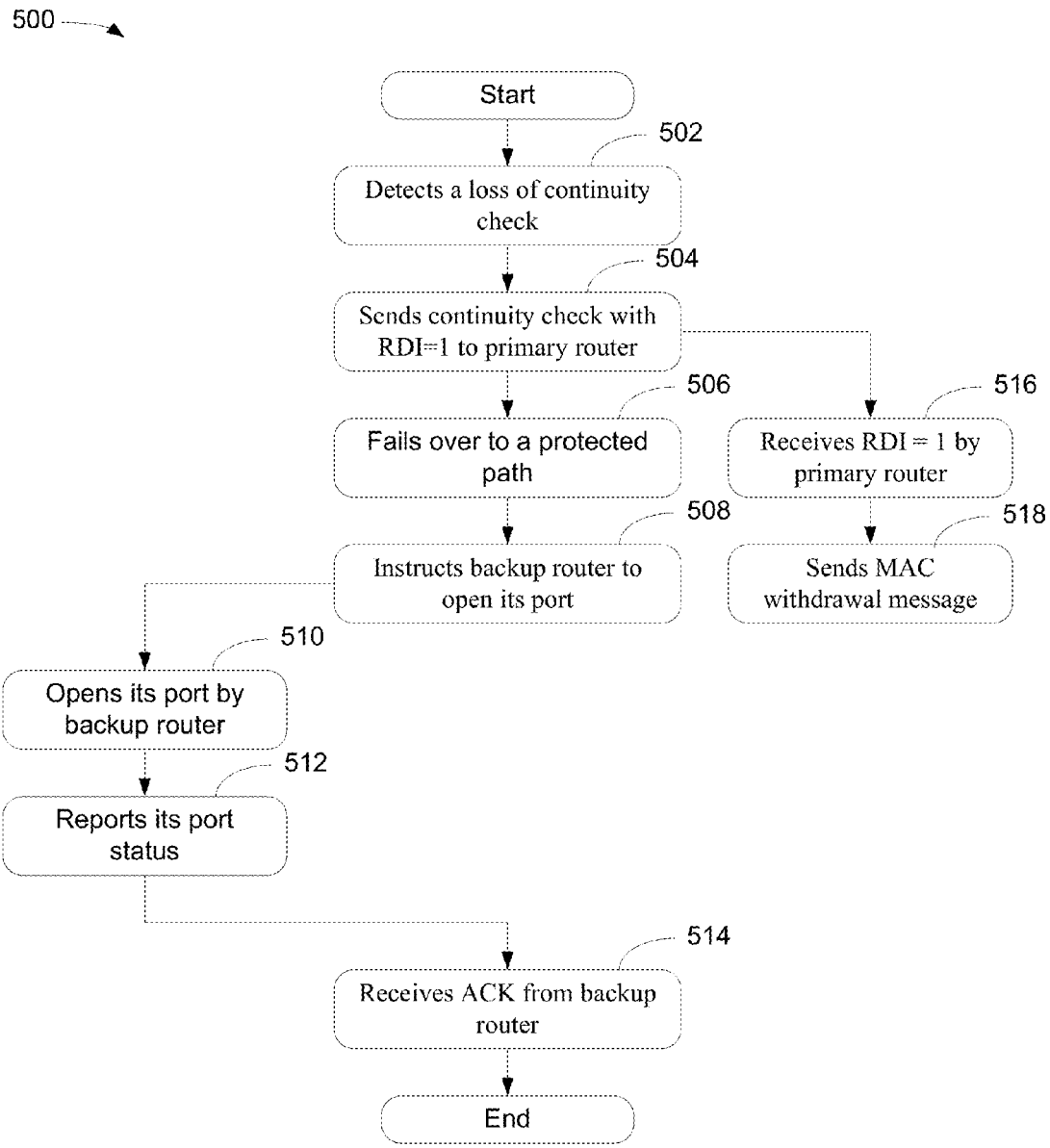
FIG. 5 is a flowchart illustrating an exemplary process of switching to a backup path in a dual homed network configuration in accordance with one embodiment of the present invention.

FIG. 5 is a flowchart 500 illustrating an exemplary process of switching to a backup path in a dual homed network configuration in accordance with one embodiment of the present invention. At block 502, a process detects a loss of CC message over a primary VLAN. A CC message with RDI=1 is sent to a primary router indicating primary VLAN down at block 504. At block 506, an access switch affected by the primary VLAN down fails over to a protected path using G.8031 message and at block 508, backup router is instructed to open its port. Upon receipt of RDI=1 at block 516, primary router at block 518 declares interface down and withdraws MAC addresses associated with the interface with an access switch to prevent black-holing or loss traffic. After opening its port(s) at the backup router at block 510, the backup router at block 512 reports its port opening status to the access switch. At block 514, upon receipt of the port opening status or acknowledge from the backup router, the access switch begins to route traffic through the backup path, also known as protected path.

Figure 6:
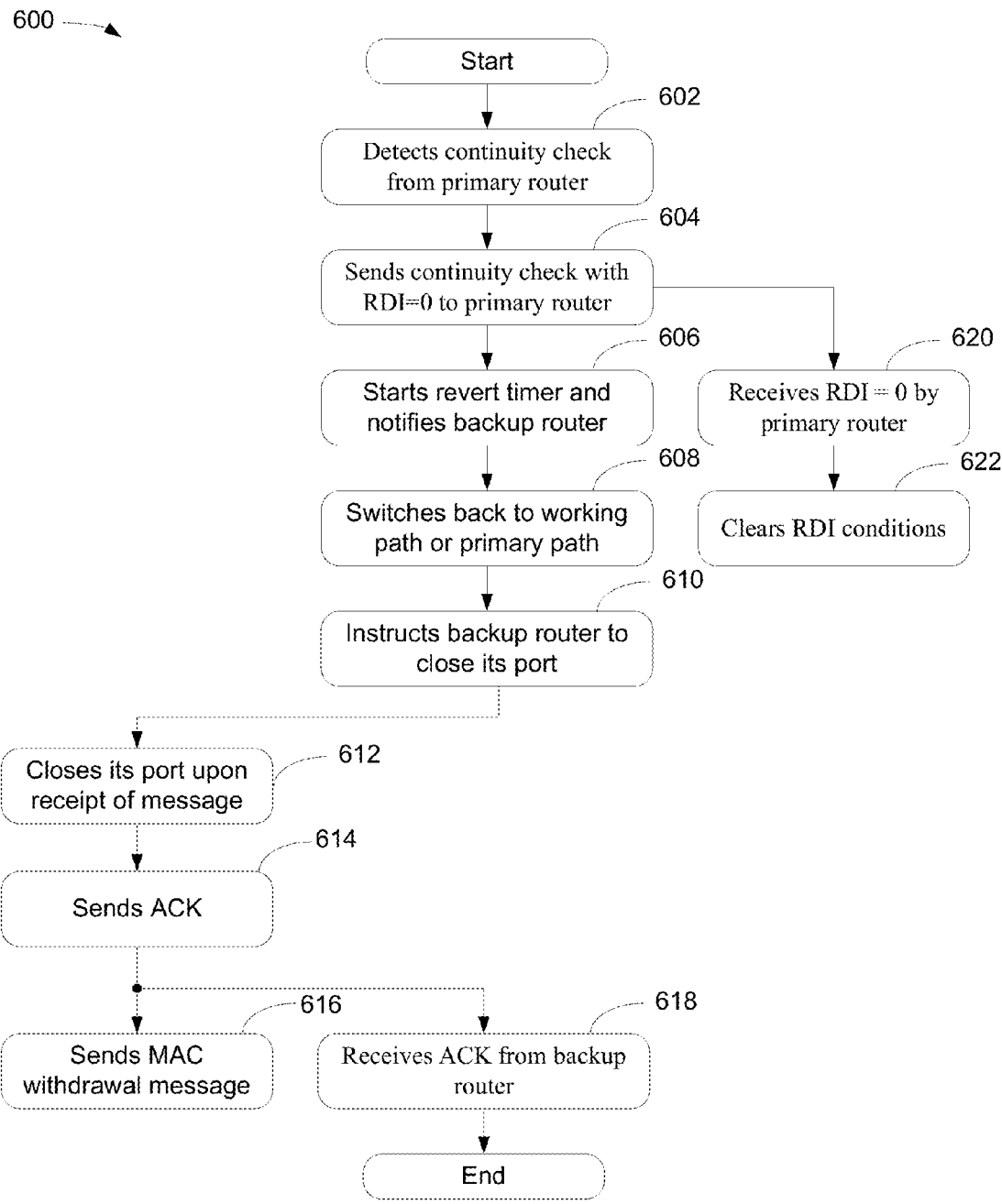
FIG. 6 is a flowchart illustrating an exemplary process of reversion to the primary path in accordance with one embodiment of the present invention.

FIG. 6 is a flowchart 600 illustrating an exemplary process of reversion to the primary path in accordance with one embodiment of the present invention. At block 602, the process of a dual homed network layout detects a CC message from the primary router. The AS, at block 604, sends a CC message with RDI=0 to the primary router. Upon receipt of RDI=0 sent from the AS at block 620, the primary router clears RDI condition(s) at block 622. At block 606, the AS starts revert-timer and notifies the backup router that the backup link will continue to route the traffic until the revert-timer expires. When the revert-timer expires, the AS, at block 608, sends a G.8031 message to revert network service from the backup router to the primary router. The AS, at block 610, sends a G.8031 message to instruct the backup router to close its port or set its port to zero (Tx=0). The backup router closes its port at block 612 and sends an acknowledgement message to the AS indicating port status. At block 616, the backup router retrieves MAC addresses learned overtime in connection to the AS interface and sends a MAC withdrawal message containing the MAC addresses to ports belonging to the same VPLS domain. After receipt of an acknowledgement message from the backup router, the AS resumes routing traffic via the primary VLAN.

Figure 7:
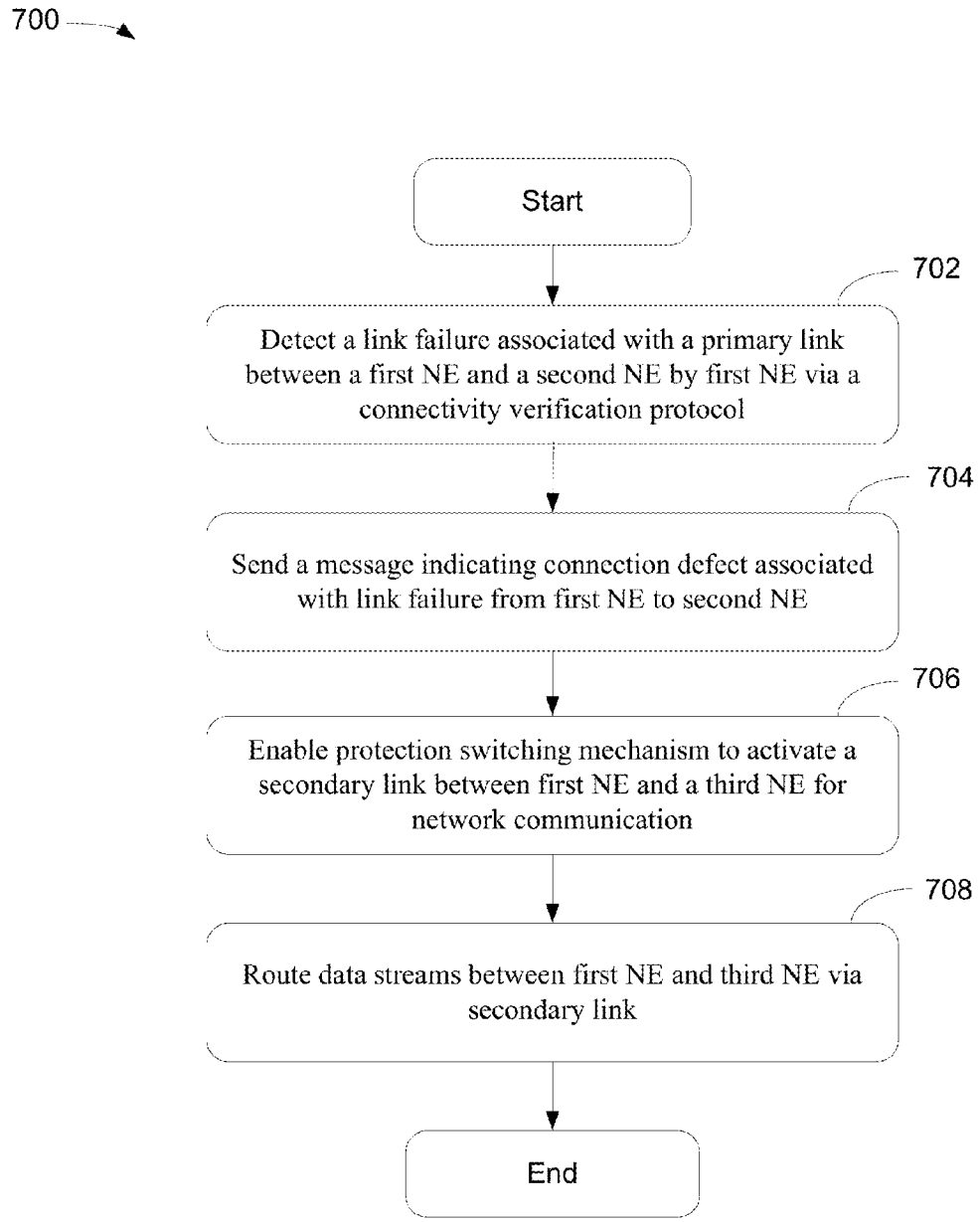
FIG. 7 is a block diagram illustrating an exemplary method of failing over to a backup router when the primary link fails in accordance with one embodiment of the present invention.

FIG. 7 is a block diagram 700 illustrating an exemplary method of failing over to a backup router when the primary link fails in accordance with one embodiment of the present invention. At block 702, a process of providing dual homed network redundancy is able to detect a link failure associated with a primary link between a first NE and a second NE by the first NE via a connectivity verification protocol. For example, a loss of CC message managed by connectivity fault management over a primary VPLS between an access switch and a primary router is detected. In one embodiment, the CC in accordance with IEEE 802.1ag standard for a point-to-point connectivity verification is monitored and checked.

At block 704, a message indicating connection defect associated with the link failure from the first NE to the second NE via the connectivity verification protocol is sent. In one embodiment, the process is further capable of sending a MAC withdrawal message to a port of the second NE. Alternatively, receipt of the message from the first NE can trigger or result in the sending of a MAC list withdrawal message from the second NE. The process is configured to declare interface down associated with the primary link upon receipt of a RDI.

At block 706, the process enables protection switching mechanism to activate a secondary link between the first NE and a third NE for network communication. For example, after the first NE or the AS switches from a G.8031 working path to a G.8031 protected path in accordance with ITU standard, an instruction for opening a port(s) is sent to the third NE via a G.8031 message. After opening one or more ports at the third NE (or backup router) coupled to the secondary link, a G.8031 message notifying port status is forwarded from the third NE (backup router) to the first NE (the AS).

At block 708, data streams between the first NE and the third NE is routed via the secondary link. In one embodiment, a dual homing protection is established between the first NE, the second NE, and the third NE utilizing Ethernet protection switching mechanisms. For example, upon employing G.8031 Ethernet Protection Switching under ITU for failover, the process is capable of utilizing CC message for connectivity verification. The process is further configured to withdraw MAC addresses associated with the primary link to minimize packet loss or black holing.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for improving network communication between multiple network devices, comprising:
    provision a continuity check ("CC") message in accordance with a connectivity verification protocol for verifying connectivity of a primary link between a network element ("NE") and a primary router;
    issuing a link failure associated with the primary link upon identifying a loss of CC message;
    obtaining media access control ("MAC") addresses learned by the primary router after receipt of the link failure and forwarding a MAC withdrawal message containing the learned MAC addresses;
    activating a secondary link between the NE and a secondary router after receipt of the MAC withdrawal message; and
    redirecting data streams from the primary link to the secondary link via the secondary router once the secondary link is activated.

2. The method of claim 1, further comprising establishing a dual homing protection between the NE, the primary router, and the secondary router utilizing Ethernet protection switching mechanism.

3. The method of claim 2, wherein establishing a dual homing protection includes,
    employing G.8031 Ethernet Protection Switching under International Telecommunication Union ("ITU") standard for failover; and
    utilizing message of continuity check under IEEE 802.1ag standard for connectivity verification.

4. The method of claim 2, further comprising sending media access control ("MAC") withdrawal message via a port of the primary router in accordance with the message.

5. The method of claim 1, wherein issuing a link failure associated with the primary link further includes detecting a loss of continuity check managed by connectivity fault management over a primary virtual private LAN service ("VPLS") between an access switch and a primary router.

6. The method of claim 5, wherein detecting a loss of continuity check managed by connectivity fault management over a primary VPLS between an access switch and a primary router includes monitoring the continuity check in accordance with IEEE 802.1ag standard for a point-to-point connectivity verification.

7. The method of claim 1, wherein issuing a link failure further includes sending a message indicating connection defect associated with the link failure and triggering to send a media access control ("MAC") list withdrawal message from the primary router upon receipt of the message from the NE.

8. The method of claim 7, wherein sending a message includes,
declaring interface down associated with the primary link upon receipt of a remote defect indication ("RDI"); and
withdrawing MAC addresses associated with the primary link to minimize packet loss.

9. The method of claim 6, wherein activating a secondary link includes,
switching to G.8031 protected path in accordance with International Telecommunication Union ("ITU") standard between the NE and the secondary router; and
sending an instruction of port opening to the third NE via a G.8031 message.

10. The method of claim 9, wherein activating a secondary link further includes,
opening a port of the third NE coupled to the secondary link in response to the instruction of port opening; and
forwarding a G.8031 message notifying status of port opening from the secondary router to the NE.

11. A method for improving network communication between multiple network devices, comprising:
restoring primary link associated with a primary router after detecting a link failure associated with the primary link;
detecting a continuity check ("CC") message indicating link recovery associated with a primary link between a network element ("NE") and a primary router;
sending a message indicating a revert from a backup link to the primary link in response to the CC message;
obtaining media access control ("MAC") addresses learned by a backup router after receipt of the message and forwarding a MAC withdrawal message containing the learned MAC addresses; and
routing data stream from the backup link to the primary link when a revert-timer expires.

12. The method of claim 11, further comprising establishing a dual homing protection between the NE, the primary router, and the backup router utilizing G.8031 Ethernet Protection Switching under International Telecommunication Union ("ITU") standard for failover and utilizing message of CC under IEEE 802.1ag standard for connectivity verification.

13. The method of claim 12, further comprising:
forwarding a G.8031 message of port close by an access switch to instruct the backup router to close its port; and
sending an acknowledgement message from the backup router to the NE once the port is closed in response to the G.8031 message of port close.

14. The method of claim 13, further comprising sending media access control ("MAC") withdrawal message relating to one or more of its ports associated with same virtual private LAN service ("VPLS").

15. The method of claim 11, wherein detecting a CC message indicating link recovery associated with a primary link further includes,
activating a system recovery process by the primary router to recover from an earlier system failure; and
initiate the CC message indicating link recovery in accordance with IEEE 802.1ag for verifying point-to-point connectivity by the backup router.

16. The method of claim 11, wherein sending a message indicating a revert from a backup link to the primary link from the NE to a backup router includes,
resetting remote defect indication ("RDI") value to reflect recovery of the primary router; and
sending a CC message with the RDI value from an access switch to the primary router.

17. The method of claim 16, wherein sending a CC message with the RDI value from an access switch to the primary router further includes starting the revert-timer.

18. A method of network communication, comprising:
detecting a loss of first continuity check across a primary link connecting between an access switch and a primary router;
sending a second continuity check with a first remote defect indication ("RDI") value indicating a primary link failure to the primary router;
retrieving media access control ("MAC") addresses learned by the primary router after receipt of the primary link failure and forwarding a MAC withdrawal message containing the learned MAC addresses;
activating a backup router in accordance with the first RDI value and replacing a secondary link with the primary link for data routing;
receiving a third continuity check with a second RDI value indicating restoration of the primary link; and
activating a reverting preparation from the backup router to the primary router.

19. The method of claim 18, further comprising routing data stream from a backup link to the primary link when a revert-timer expires.

20. The method of claim 19,
wherein the first continuity check employs connectivity verification protocol including continuity check messages under IEEE 802.1ag standard; and
wherein the primary link is able to implement primary virtual local area network ("VLAN") and the backup link is able to perform backup VLAN.

* * * * *